United States Patent Office.

IMPROVEMENT IN THE MANUFACTURE OF ARTIFICIAL FUEL.

HENRY G. DAYTON, OF MAYSVILLE, KENTUCKY.

Letters Patent No. 59,791, dated November 20, 1866.

SPECIFICATION.

TO ALL WHOM IT MAY CONCERN:

Be it known that I, HENRY G. DAYTON, of Maysville, in the county of Mason, and State of Kentucky, have made a new and useful Composition for Saturating Material for Kindling; and I do hereby declare the following to be a full, clear, and exact description of the nature, construction, and operation of the same, sufficient to enable one skilled in the art to which it appertains to use the same:

The improvement consists of a composition of ingredients for saturating corn cobs or other material previously reduced to a proper size for kindling or for fuel.

It also consists in the preparation of corn cobs for a like purpose by saturating them with the above composition.

The immense bulk and quantity of corn cobs that are yearly thrown away may be inferred from the immense yearly production, the fact that there are about sixteen pounds of dry cob to the bushel of corn, and the further fact that but a small proportion of the quantity is utilized in any way.

Immense quantities are collected at barns where corn is shelled for transportation, and in warehouses and elevators where ear corn is brought and shelled for shipment, and the cobs are made of but little service, and being light and porous do not make first-class fuel, while their character perfectly adapts them to be used as a material for saturation with a resinous matter which I proceed to describe.

The composition consists of rosin, two parts, and one part of the residuum of the distillation of petroleum. These are intimately mixed, and in the boiling or fluid compound the cobs or other woody material reduced to a proper size is plunged; after saturation has taken place, or the material has absorbed a sufficient quantity, it is removed, and being thrown upon or into a place where the superabundant composition may drain away from it, it quickly hardens and dries, and is ready for use.

Three or four corn cobs thus treated will be sufficient when ignited to boil a gallon of water; and as summer fuel for an occasional fire, will form an economical and sufficient fire.

One cob thus treated will be sufficient kindling for a wood fire and two for a bituminous coal fire.

In the prairies of the West, where quantities of corn are occasionally burned for fuel, the cobs thus treated would form a far more economical and convenient material.

Having described my invention, what I claim therein as new, and desire to secure by Letters Patent, is—

As a composition for treating or saturating corn cobs or kindling wood, a compound of rosin and the residuum of the petroleum distillation, in about the proportions described.

I claim, also, as a new article of manufacture, a kindling material composed of corn cobs treated or saturated with the above composition.

To the above specification of compound for saturating kindling materials, cobs, &c., I have signed my hand, this       day of                                     1866.

HENRY G. DAYTON.

Witnesses:
CHARLES A. PETTIT,
W. F. HALL.